July 21, 1942. J. G. WINSOR 2,290,460
VEHICLE FOR TRANSPORTING GRANULAR MATERIAL
Filed April 29, 1940 3 Sheets-Sheet 1
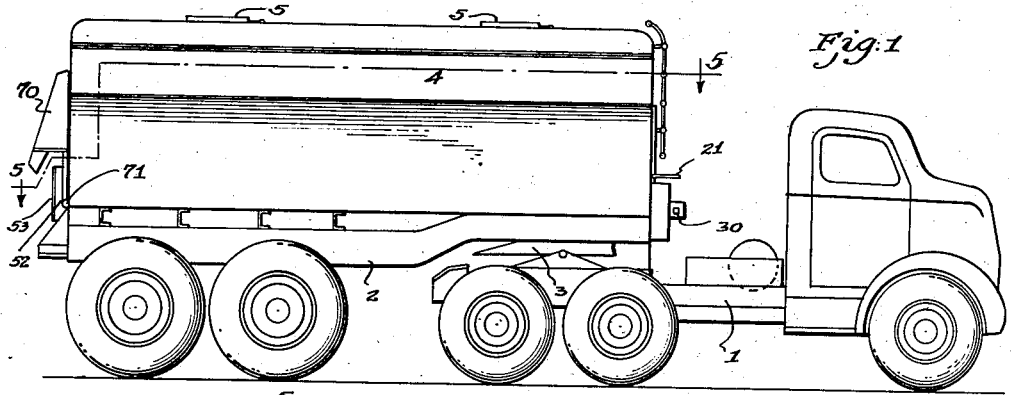
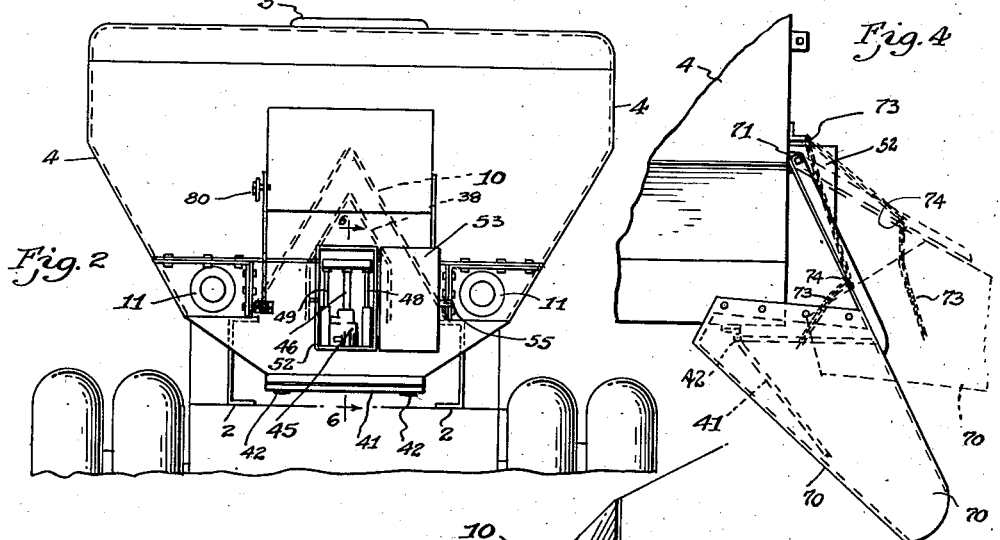
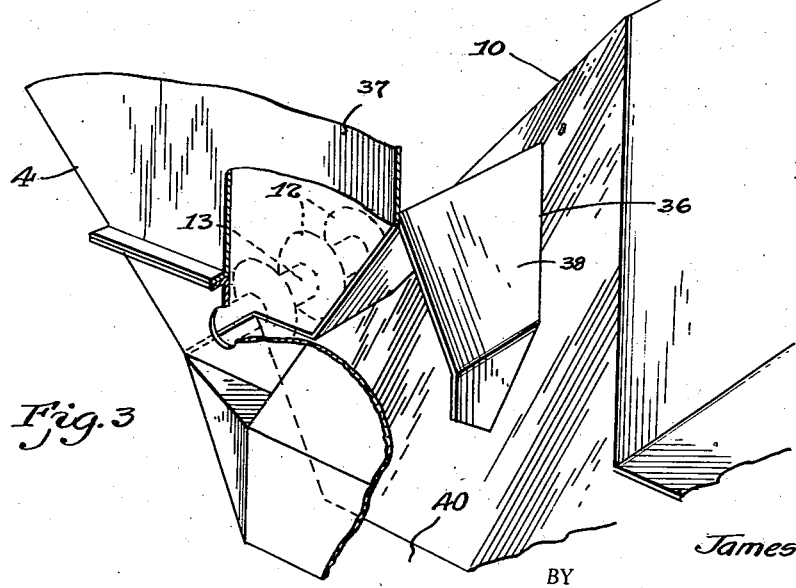
INVENTOR.
James G. Winsor
BY
Barnes, Kisselle, Laughlin & Raisch
ATTORNEYS

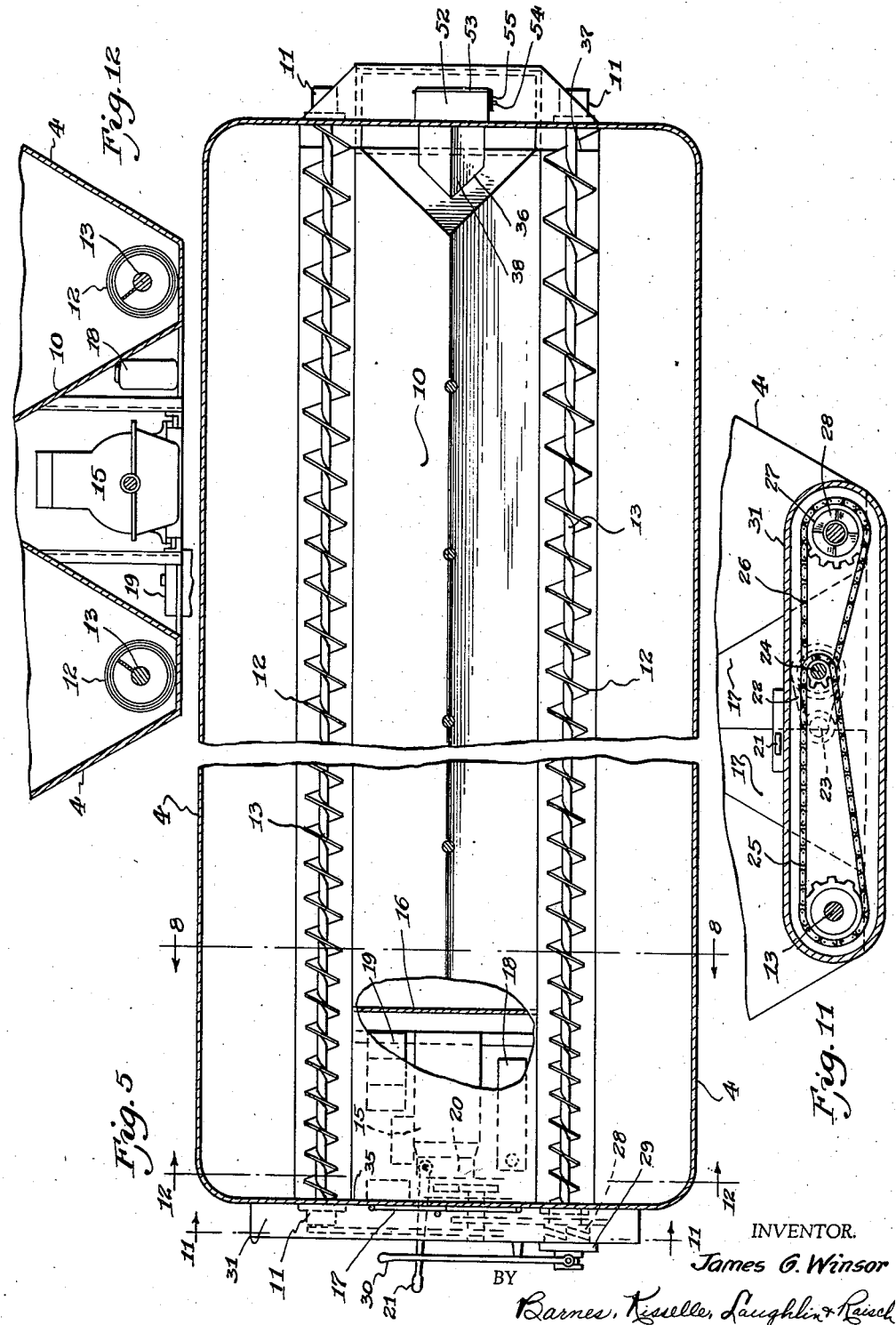

July 21, 1942.  J. G. WINSOR  2,290,460
VEHICLE FOR TRANSPORTING GRANULAR MATERIAL
Filed April 29, 1940   3 Sheets-Sheet 3
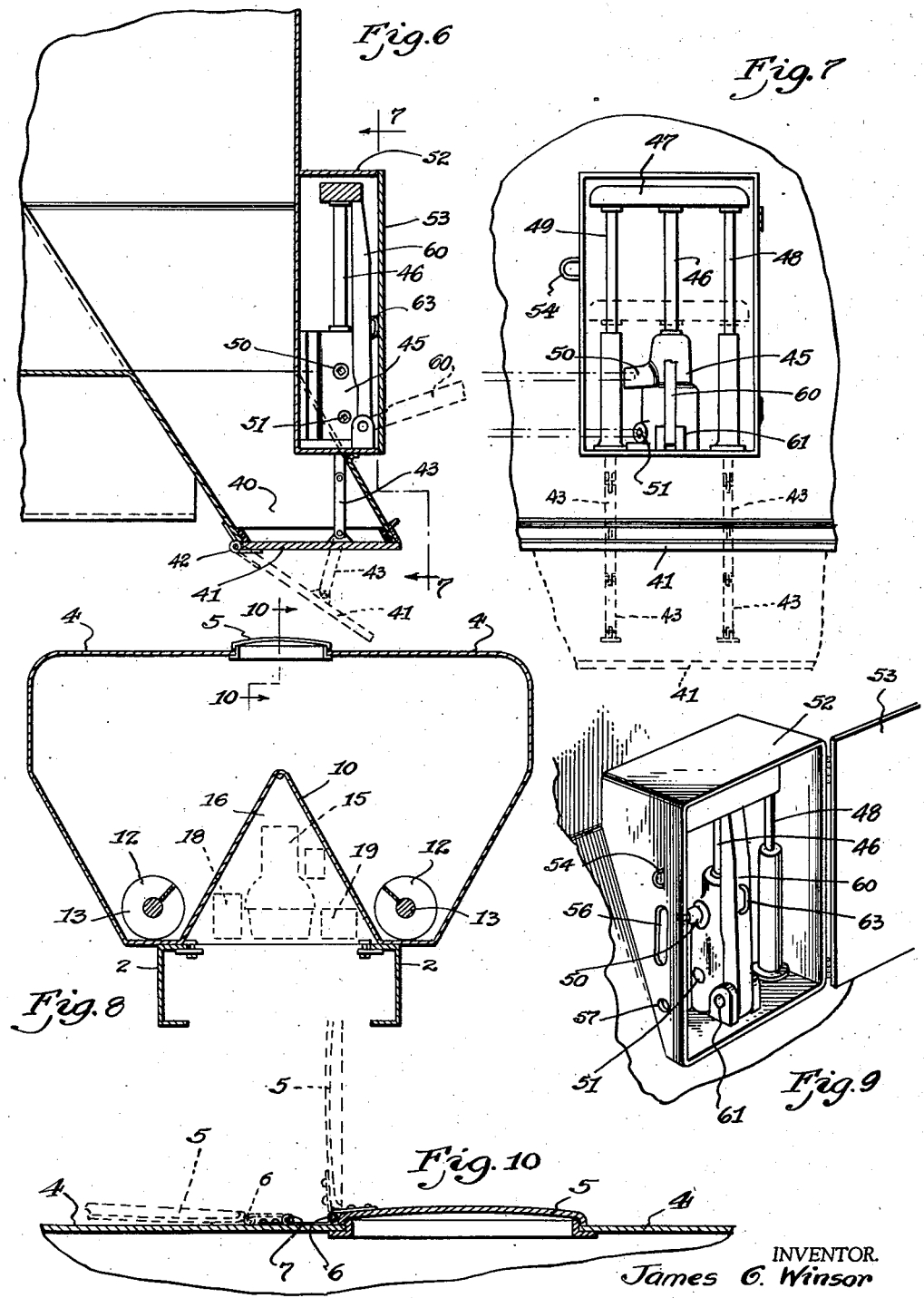
INVENTOR.
James G. Winsor
BY
Barnes, Kisselle, Laughlin & Raisch
ATTORNEYS Patented July 21, 1942

2,290,460

UNITED STATES PATENT OFFICE 2,290,460

VEHICLE FOR TRANSPORTING GRANULAR MATERIAL

James G. Winsor, Detroit, Mich.

Application April 29, 1940, Serial No. 332,270

15 Claims. (Cl. 214—83)

This invention relates to a vehicle especially adapted for the transportation of bulk granular material such as cement, sodium chloride, grains or the like.

While the invention, in some of its phases, relates particularly to a combined vehicle of the tractor semi-trailer type, some phases relate to vehicles generally, such as trucks and four-wheel trailers. Among the objects of the invention is the provision of an arrangement in a vehicle of the tractor semi-trailer type which permits of carrying an increased proportion of a load forwardly over the tractor wheels to thus more properly distribute the load; this arrangement thus permits carrying a heavier pay load, particularly in those States or localities where the load on each axle is limited. This is done with an arrangement which, at the same time, provides adequate clearance between the trailer body and the tractor body or cab for the turning of the two relative to each other.

Other objects of the invention include an improved arrangement for the discharge of the granular material by means of screw conveyors, and this includes a novel arrangement in the screw structure. A further object of the invention is to provide a vehicle of tank form having two compartments or troughs with an arrangement for stiffening and strengthening the body, and at the same time, providing for a common outlet. This phase of the invention may be incorporated in a body or tank structure having more than two troughs. A further object of the invention is to provide a simplified structure for the discharge of the contents which, notwithstanding the simplicity and ease of operation, has a high safety factor resulting in assurance of operation and which can be easily handled and controlled. Other objects will appear as the detailed description progresses.

An arrangement for carrying out the invention is disclosed in the accompanying drawings wherein:

Fig. 1 is a side elevational view of a tractor semi-trailer vehicle constructed in accordance with the invention.

Fig. 2 is a rear end elevational view of the vehicle.

Fig. 3 is a perspective view with parts cut away and with some parts in section illustrating interior structure.

Fig. 4 is a view of the rear end of the body with the spout or chute in an operative position.

Fig. 5 is a sectional view taken substantially on line 5—5 of Fig. 1 with some parts cut away.

Fig. 6 is an enlarged sectional view taken substantially on line 6—6 of Fig. 2 showing the control arrangement for the outlet.

Fig. 7 is a view taken substantially at right angles to Fig. 6 on line 7—7 of Fig. 6.

Fig. 8 is a sectional view taken substantially on line 8—8 of Fig. 1 showing the interior trough formation.

Fig. 9 is a perspective view of the arrangement of the structure for controlling the outlet.

Fig. 10 is an enlarged cross sectional view of the filling aperture structure and cover taken substantially on line 10—10 of Fig. 8.

Fig. 11 is a view illustrating the driving apparatus for the screws.

Fig. 12 is a partial sectional view taken substantially on line 12—12 of Fig. 5.

The vehicle illustrated includes a tractor 1 and a trailer generally illustrated at 2 connected together to operate as a unit through the means of the usual fifth wheel structure 3. The forward end of the trailer, or semi-trailer as they are usually called, rests upon the tractor.

The trailer includes a body in the nature of a tank composed largely of sheet metal and illustrated generally at 4. The tank may be filled with the granular material or cement through openings at the top, closed by caps 5. These closure caps are preferably arranged with a double hinge which includes a pintle 6 and a pintle 7 so that the caps may be folded back and caused to lie flat on the top of the tank as illustrated in Fig. 10.

The tank is formed with two trough structures as shown in Fig. 8, there being a tunnel formation running through the tank from one end to the other as generally indicated at 10. There is a screw in each trough near the bottom thereof for propelling the contents to the outlet end, and these screws run the length of the troughs as shown in Fig. 5, having end bearings 11 and each preferably with a center bearing 12. The screws are shown at 13.

It is to be appreciated, of course, that the tractor and trailer pivot relative to each other and there are times when the two vehicles may be at right angles to each other, or even jack knifed to an extent more than at right angles; therefore, there must be adequate clearance between the front of the trailer body and the cab of the tractor in order to clear the sides of the tank under these conditions. Power means is required to turn the screws, and heretofore such power means have been placed out in front of the trailer body. This, of course, diminishes the clearance and requires the trailer body to be set back from the tractor cab, destroying the load distribution. In accordance with the present invention the engine for driving the screws is located within the trailer body, diminishing its capacity, and more specifically the engine is located within the tunnel 10. As shown in Fig. 5, the engine 15 is located at the forward end of the trailer but within the tunnel, and it may be substantially closed at its rear end by a plate 16 which is preferably removable for access to the engine for service purposes. The front end of the tunnel may be closed by one or more doors 17 so that the engine is confined and protected from dirt and dust. In fact, the entire power unit is located in this engine compartment, including a fuel tank 18 and battery 19. The engine may include a usual clutch housing 20 in which is a clutch (not shown) controllable by a handle 21.

The drive structure is shown in Fig. 11 where will be seen a chain 22 operating over sprockets on the engine shaft 23 and counter-shaft 24. On the countershaft 24 are two sprockets over which operate chains 25 and 26, one for driving each shaft. The chain 26 connects to the one screw shaft at all times, while a sprocket 27 is an idler provided with a clutch member 28, and keyed to the shaft is a shiftable clutch member 29 operable by a handle 30. This drive structure may be enclosed by a housing 31. With this structure it will be observed that when the engine 15 is operating, one screw 13 may be operated by the closing of the engine clutch through the means of the handle 21; this is through the drive chain 25. This condition may contine until one trough is unloaded and then the clutch 28—29 may be engaged to drive the other screw. Both screws may be operated at the same time.

It is to be understood that various states or localities prescribe, by laws or regulations, limitations on the maximum load per axle and the spacing between axles, etc. A maximum load can only be carried when the load is properly distributed over the axles, with the axles at the various prescribed spacings. Now, by pocketing the engine within the confines of the trailer body, the body may be made longer than those heretofore employed so that it extends forwardly over the tractor wheels, thus placing a greater proportion of the load over the tractor wheels. In order to carry a maximum pay load the body should be properly designed to approximate the maximum load per axle at their proper spacing, both on the trailer and tractor axles. At the same time adequate clearance between the front end of the trailer and the tractor cab is maintained for turning purposes.

The type of body shown in the drawings where there is a tunnel formation, provides a pocket or enclosure for the motor without in any way reducing the total tank capacity. If a special pocket be provided, as for example, in a tank where there is no adequate tunnel formation, the body can still be of increased length with the pay load distributed adequately forwardly over the tractor wheels. Such a special pocket may reduce the total possible capacity by the size of the pocket, but nevertheless a large proportion of the load is distributed forwardly because the pocket only takes up a small part at the forward end of the tank, and proper distribution of the load may be obtained. In either case, it is possible to distribute the pay load throughout the length of the vehicle chassis without increasing the over-all length of the vehicle, and this is true of tractor semi-trailer units, four wheel trailers or trucks.

The tunnel structure extends from end to end and is connected to the ends of the tank and forms a reenforcing backbone therefor. The trough may be welded to the front wall at the point of intersection as shown at 35. At the rear end, however, the trough structure 10 is reduced in cross sectional size to provide an adequately sized passage to the common outlet.

This is demonstrated in Fig. 3. The large part of the trough has an end wall 36 spaced from the end wall 37 of the tank; and a smaller structure, generally illustrated at 38, is secured to the wall 36 as by means of welding or the like, and is in turn welded or otherwise connected to the end panel 37. Thus the two troughs connect to a common outlet passage 40.

The outlet opens downwardly as shown in Fig. 6 and is closed by a closure plate 41, hinged as at 42 and operated and held by links 43. Mounted on the rear end of the body is an operating unit in the form of a jack 45, which may be a screw jack, hydraulic jack or other operating mechanism, having a lifting ram 46 and a cross head 47, connected to which are depending rods 48 and 49, the lower ends of which connect to the links 43. This jack may be operated by an up and down reciprocating motion of the operating piece 50 and a reversing valve is shown at 51 by means of which the ram 46 is elevated or lowered. The jack structure is mounted in a box 52 on the back end of the vehicle provided with a door 53 which is hinged and which may be closed and locked by means of a ring 54 on the side of the box, and a hasp 55 on the door. The box is provided with an elongated slot 56 and an aperture 57 positioned so that a jack handle may be inserted through the operture 57 to shift the reversing valve 51 and so that a jack handle may be passed through the slot 56 to reciprocate the operating piece 50. A safety strut 60 is pivotally mounted, as for example, on the floor of the box near the base of the jack as shown at 61. A gasket 62 preferably surrounds the outlet opening.

This structure operates as follows: the closure 41 is elevated by the operation of the jack through the means of a tool passing through the slot 56, the closure being pulled upwardly by the links, the hinge 42 is preferably loose so that the links pull the door up bodily against the gasket for a tight sealing closure, and the cross head 47 is at this time elevated as shown in Figs. 6 and 7. The strut 60 is now shifted to an upright position as shown in Fig. 6 so that it is positioned under the cross head. The door 53 may now be closed and locked, and as shown in Fig. 6, it may butt up against the strut or its handle 63, thus preventing the strut from dislocation.

From this structure it will be clear how the tank may be filled through the top openings and the bulk of material transported. At the unloading station the operator may first open the door 53 of the box, pull the strut 60 out of position, and then lower the jack, thus opening and lowering the closure 41 for the outlet. The motor 18 may then be started with the clutch 28—29 open. Thus the chain 25 operates one screw to discharge the contents of one trough. Then the clutch 28—29 may be closed to operate both screws and thus discharge the contents of the other trough.

A chute or funnel 70 is pivotally mounted on the back of the tank, as shown at 71, and this may be swung to a lowered position, that is from the position shown in Fig. 1 to the position shown in Fig. 4, for guiding and discharging the contents to a point rearward of the outlet. By means of a chain 73 fastened at one end to the body, the links of which are engageable in a notch 74, the chute may be adjusted as to its angularity, and extent from the rear end of the vehicle. This is shown in dotted lines in Fig. 4. When the chute is used, the closure 41 lies within the chute, as shown in Fig. 4, and preferably when the chute is to be used it is lowered before the closure 41 is opened. The chute may be held up in folded position as shown in Fig. 1 by suitable means such as a bolt or pin 80 passing through aligned apertures in a part of the chute and body.

Now as to the discharging screws, there are some features which are important. These features reside principally in that the screws are tapered preferably from one end to the other, having a relatively small diameter at the forward end and a relatively large diameter adjacent the outlet end. The screws may be substantially identical. Moreover, the pitch of the screws preferably increases so that the pitch is greater at the locations of great diameter. One arrangement which has been found to be expedient, although the invention is not limited to this particular arrangement, is where the screw was about 18 feet in length with an over-all diameter at the small end of about 5 inches and an over-all diameter at the large end of about 9 inches, and where the pitch corresponded substantially to the diameter; in other words, at the small end, the pitch of the screw was about 5 inches, while at the large end the pitch was about 9 inches. The variation in pitch may progress gradually from one end to the other, or for manufacturing purposes may progress in sections. That is to say, at the small end there would be a section with a 5-inch pitch and then followed by a section of a larger pitch and so on to the large end. These figures are given for exemplary purposes only. Moreover, the screws have a center bearing as above described for stabilizing the same.

This formation of the screws results in a highly desired and improved operation. Heretofore where vehicles of this type used straight screws there was much difficulty in starting the screws. In fact the torque, in some instances, has been so great as to twist off shafts and break other power transmitting apparatus. With the present screw the capacity is much smaller at the end remote from the outlet, and this gradually increases. Now this is important in a screw of this kind where there is a head of material over the screw from one end to the other. Such a screw has been found to start very easily; the initial turning torque and the torque in operation is lowered and yet there is no loss of capacity. This appears to be due to this: That each convolution of the screw can take the material which is fed to it by the convolutions back of it and can also receive and move forwardly a portion of the material which is fed directly to the convolution from the supply of material above the same. The action in discharging the cement is also highly improved. With a straight screw there is evidently a lifting action of the body of cement overlying the same. This appears to be due to the fact that the convolutions at the outlet end have no greater capacity than those at the opposite end, and yet these convolutions are attempting to receive the cement fed to it by other convolutions, and also attempting to receive cement from the head immediately above the same. This causes a churning and apparently a lift bodily of much of the cement in the tank. This seemingly is the reason for the great starting torque of screws of uniform diameter from one end to the other. With the present screw this churning of the cement is avoided and the level of the cement throughout the length of the body drops substantially uniformly and evenly much as a head of water would fall. The increasing diameter of the convolutions seems to provide an arrangement where the convolutions can take and advance some of the cement from the head immediately above the same and at the same time receive and move forwardly that body of cement which is advanced to it from the convolutions to the rear thereof.

I claim:

1. A semi-trailer for transporting granular material and adapted to have its forward end pivotally rest upon a tractor, said semi-trailer having a tank-like body, a tunnel formation extending through the tank-like body substantially from its forward to its rearward end, and defining troughs within the body for the granular material, propelling means in each trough for shifting the material for discharge purposes, and an engine mounted in the tunnel formation at one end of the semi-trailer and substantially within the exterior contour of the tank-like body for driving the propelling means whereby the engine is disposed in a non-interfering position relative to the tractor body.

2. A semi-trailer for transporting granular material and adapted to have its forward end pivotally rest upon a tractor, said semi-trailer having a tank-like body for the granular material, said body having a space formed therein and opening at its forward end and defined by walls which confine the granular material, propelling means in the body for shifting the material for discharge purposes, and an engine for driving the propelling means and mounted in said space at its open forward end and located substantially within the confines of the exterior contour of the tank-like body.

3. A semi-trailer for transporting granular material and adapted to have its forward end pivotally rest upon a tractor, said trailer having a tank-like body, a tunnel formation extending through the body substantially from its front to its rear ends and defining troughs for the material, a propelling screw in each trough for shifting the material for discharge purposes, said body having an outlet for the material in its rear end, and an engine for driving the propelling means and located in said tunnel formation at the said front end and confined substantially within the exterior contour of the tank-like body.

4. A vehicle for transporting granular material comprising, a body in the form of an elongated sheet metal tank having side walls and rear walls and formed with a single outlet opening at one end, a sheet metal tunnel formation dividing the body longitudinally into troughs for the material, said tunnel formation having a reduced section at the location of the outlet opening for the flow of material from each trough to and through said outlet opening, said tunnel formation being of rigid construction and being secured to the end walls to form a backbone reenforcement for the body.

5. A vehicle for transporting granular material comprising, a tank-like body for receiving the material, a screw member extending lengthwise through the body adjacent the bottom thereof for propelling the material toward one end of the body for discharge purposes and which is exposed to the material in the body substantially for its entire length, said end of the body having a discharge outlet, means for driving the screw member, said screw member having a relatively small over-all diameter at its end remote from the outlet opening and a relatively large over-all diameter at its end adjacent the outlet opening, with the diameter increasing from one end to the other.

6. A vehicle for transporting granular material comprising, a tank-like body for receiving the material, a screw member extending lengthwise through the body adjacent the bottom thereof for propelling the material toward one end of the body for discharge purposes and which is exposed to the material in the body substantially for its entire length, said end of the body having a discharge outlet, means for driving the screw member, said screw member having a relatively small over-all diameter at its end remote from the outlet opening and a relatively large over-all diameter at its end adjacent the outlet opening, with the diameter increasing from one end to the other, and the screw having a relatively small pitch at its small diameter end and a relatively large pitch at its large diameter end, with the pitch increasing from one end to the other.

7. A vehicle for transporting granular material comprising, a tank-like body having a relatively narrow trough-like bottom portion, said body having an outlet at one end, a screw member disposed in the trough-like portion and being substantially completely exposed to the interior of the body, means for driving the screw member to propel the material toward the outlet, said screw member having a varying diameter which is relatively small at the end remote from the outlet and relatively large at the end adjacent the outlet.

8. A vehicle for transporting granular material comprising, a tank-like body having a relatively narrow trough-like bottom portion, said body having an outlet at one end, a screw member disposed in the trough-like portion and being substantially completely exposed to the interior of the body, means for driving the screw member to propel the material toward the outlet, said screw member having a varying diameter and having a varying pitch to its screw, both of which are relatively small at its end remote from the outlet and relatively large at the end adjacent the outlet.

9. A vehicle for transporting granular material comprising, a tank-like body having a relatively narrow trough-like bottom portion, said body having an outlet at one end, a screw member disposed in the trough-like portion and being substantially completely exposed to the interior of the body, means for driving the screw member to propel the material toward the outlet, said screw member having a gradually increasing over-all diameter from its relatively small end which is remote from the outlet to its relatively large end adjacent the outlet.

10. A vehicle for transporting granular material comprising, a tank-like body having a relatively narrow trough-like bottom portion, said body having an outlet at one end, a screw member disposed in the trough-like portion, means for driving the screw member to propel the material toward the outlet, said screw member having a gradually increasing over-all diameter from its relatively small end which is remote from the outlet to its relatively large end adjacent the outlet and having a pitch to its screw which is relatively small at its small diameter end and which increases to a relatively large pitch at its large diameter end.

11. In a vehicle for transporting granular material, a tank-like body for the material, a downwardly opening outlet at one end of the body, a closure for the outlet, a jack mounted on the rear end of the body and having a lifting ram and means operably connecting the ram with the closure piece whereby the closure piece may be elevated by the jack to close the opening, and a safety strut adapted to be positioned under a portion of the lifting ram when the same is elevated for closing the outlet.

12. In a vehicle for transporting granular material, a tank-like body for the material, a downwardly opening outlet at one end of the body, a pivotally mounted door for the outlet, said pivot having a loose pintle for shift bodily of the door, a jack mounted on the rear end of the body, a lifting ram therefor, a cross head on the lifting ram, means including links connecting the cross head with the door, and a safety strut adapted to be positioned under the cross head when the door is in closed position.

13. In a vehicle for transporting granular material and having a tank-like body with an outlet at one end, a closure member for the outlet, a box mounted on the vehicle at the outlet end, a lifting jack in the box, means connecting the jack to the closure member whereby operation of the jack opens and closes the said member, said box having one or more openings therein through which a tool is insertable for operation of the jack, and a door for the box closable to prevent access to the jack.

14. In a vehicle for transporting granular material and having a tank-like body with an outlet at one end, a closure member for the outlet, a box mounted on the vehicle at the outlet end, a lifting jack in the box, means connecting the jack to the closure member whereby operation of the jack opens and closes the said member, said box having one or more openings therein through which a tool is insertable for operation of the jack, a pivotally mounted strut adapted to be swung into a position to hold closure closed against jack failure, and a door for the box closable to prevent access to the jack, and engageable with the strut to hold the strut in operative position.

15. A semi-trailer for transporting granular material and adapted to have its forward end pivotally rest upon a tractor, said semi-trailer having a tank-like body, a tunnel formation in the bottom of the tank-like body extending substantially from its forward end to its rearward end, said tunnel formation being disposed substantially centrally and cooperating with the side walls of the tank-like body to define two troughs within the tank-like body, a rotary material propelling screw disposed adjacent the bottom of each trough for shifting granular material for discharge purposes, an engine mounted in the tunnel formation so that it is outside of the material containing hollow of the tank-like body but substantially within the exterior contour of the body, said engine being disposed so that its drive shaft extends longitudinally of the body, driving means operatively connected to the engine, and power transmitting means extending transversely of the tank-like body in opposite directions and operatively connecting the driving means and the material propelling screws.

JAMES G. WINSOR.